Patented May 29, 1945

2,377,113

UNITED STATES PATENT OFFICE 2,377,113

DEHYDROGENATION OF HYDROCARBONS

Charles L. Thomas, Chicago, Ill., assignor to Universal Oil Products Company, Chicago, Ill., a corporation of Delaware No Drawing. Application June 13, 1940, Serial No. 340,359

10 Claims. (Cl. 260—680)

This invention, which is a continuation-in-part of my co-pending application, Serial No. 286,175 which was filed July 24, 1939, relates to the catalytic conversion of hydrocarbons by means of improved catalytic material. More particularly the invention relates to the dehydrogenation of aliphatic hydrocarbons, either of the saturated or paraffinic type to the corresponding mono-olefin or of hydrocarbons of the mono-olefinic type having four or five atoms per molecule to the corresponding di-olefin.

The process may be used for dehydrogenating normally gaseous or normally liquid hydrocarbons, although it is particularly useful in dehydrogenating the normally gaseous hydrocarbons such as butane and propane. Such hydrocarbons or mixtures thereof may be obtained from petroleum sources or from natural or cracking plant gases by known processes of separation. Similar hydrocarbons from other sources may also be converted.

In one specific embodiment the present invention comprises a process for dehydrogenating aliphatic hydrocarbons to produce hydrocarbons of a more highly saturated character by contacting said hydrocarbons with a catalytic material comprising a composite of alumina and chromia promoted by the addition thereto of minor amounts of a compound and particularly an oxide of a metal selected from the group consisting of copper, cerium, thorium, manganese, vanadium and molybdenum.

The catalysts of the present invention are normally prepared by impregnation, mixing, coprecipitation, and otherwise combining the various constituents under conditions whereby active catalytic composites are obtained. The alumina constituent may be obtained, for example, from various natural ores which are treated to convert them to the oxide form, usually by heating with or without added steam.

A further method of preparing the activated alumina is by the precipitation of aluminum hydroxide from a salt of aluminum, such as aluminum nitrate or aluminum chloride, by the addition thereto of ammonium hydroxide or other alkaline precipitants. The chromia constituent may be added by mixing granular or powdered activated alumina with an aqueous solution of chromic acid followed by drying.

Another method comprises mixing activated alumina with chromium trioxide and heating at a temperature of approximately 300° C., whereby the chromium trioxide ($CrO_3$) is converted to the sesquioxide ($Cr_2O_3$) with the evolution of oxygen.

Another method which has been found useful comprises the coprecipitation of aluminum hydroxide and chromium hydroxide from aqueous solutions of salts such as the nitrates by the addition of ammonium hydroxide, and drying the precipitate. The third component may also be precipitated at the same time.

In another alternative, activated alumina is mixed with a solution of a chromium salt and the hydroxide precipitated by the addition of ammonium hydroxide.

The third component may be added in a number of ways. One convenient method consists in dissolving the oxide or carbonate of the third component in a solution of chromic acid. The activated alumina is then impregnated with mixed hydroxides precipitated from the solution by ammonium hydroxide, dried and calcined.

According to another method, the third component may be added in combination with one of the other constituents such as, for example, in the form of a soluble chromate such as the dichromate, or it may be added as a salt which is then precipitated on the alumina simultaneously with the chromia. The quantity of chromia in the final mixture may vary considerably depending in part upon the method by which the catalyst is prepared. It is normally of the order of 4–30%, and preferably of the order of 10–20% by weight. The quantity of promoting oxide added to the alumina-chromia catalyst likewise may be varied over a considerable range, but is usually within the range of 0.1–20% by weight, normally 0.1–10%.

The catalysts of the invention may be used as powders but are usually used in the form of particles such as granules, pellets, etc. Granules of activated alumina may be impregnated, dried, calcined and used without forming or pelleting. When activated alumina powder is used as the starting material, it is impregnated, dried, and the powder is mixed with a suitable lubricant such as aluminum stearate, stearic acid, stearic acid and flour, metal powders, etc., and formed by compression methods into shapes such as pellets or spheres which are used as packing material in towers or tubes. Following this step the catalyst is calcined at a temperature in excess of 500° C.

The catalyst granules, pellets, spheres or other suitable shapes are used as packing materials for reactor tubes, reaction chambers, or similar apparatus through which hydrocarbon gases or vapors are passed under proper conditions for conversion.

The process conditions for catalytic dehydrogenation, of gaseous hydrocarbons for example, are as follows; the temperatures at which conversion takes place are normally within the range of 450–700° C., or higher. The pressure employed may be subatmospheric, atmospheric or slightly superatmospheric of the order of 50–100 pounds per square inch. The time of contact ranges from 0.5 to 60 seconds, normally being 0.5–6 seconds.

During the course of the reaction there is a gradual deposition and accumulation of non-volatile carbonaceous material on the catalytic surfaces, whereby they are eventually rendered less active. The catalysts can then be reactivated by heating them in the presence of an oxygen-containing gas at temperatures in excess of 500° C., whereby the carbonaceous deposits are removed to a greater or less degree by combustion.

Although the compounds and particularly the oxides of the elements used in the present invention for increasing the catalytic effect of alumina-chromia catalysts are all definitely effective, it is not intended to infer that the different compounds of any one element or the corresponding compounds of different elements are exactly equivalent in their promoting effect.

The following examples are given to illustrate the usefulness of the present type catalysts but should not be construed as limiting it to the exact conditions given therein, either as to the reaction in which they are employed is concerned, to their components or the exact method of their preparation.

One hundred parts of granular activated alumina were impregnated with a solution of chromic acid followed by drying and reimpregnation until a total of 12% chromia was obtained in the catalytic mass. This reagent was divided into a number of portions for use in the following examples. One portion of the material was calcined at a temperature of 500° C. and used to catalytically dehydrogenate a mixture of butanes at 600° C., and a contact time of 2 seconds. The yield of butenes when operating over a four-hour period without regeneration amounted to 16% of the original charge.

*Example 1*

A portion of the alumina-chromia composite was impregnated with a solution of thorium nitrate and the mass was calcined at 500° C. to decompose the nitrate. Its activity for the dehydrogenation of a mixture of butanes under the conditions used with the alumina-chromia was greater than that of the unpromoted material as shown by the fact that 19% of butenes were produced.

*Example 2*

A portion of the alumina-chromia was impregnated with a solution of manganese nitrate followed by calcining at a temperature of 500° C. The yield of butenes obtained when dehydrogenating a mixture of butanes under the conditions cited amounted to 26%.

*Example 3*

A portion of the alumina-chromia was impregnated with cerium nitrate and was then dried and calcined at 500° C. The yield of butenes when dehydrogenating with this catalyst was 21%.

I claim as my invention:

1. A process for dehydrogenating normally gaseous hydrocarbons which comprises contacting said hydrocarbons with a catalyst consisting of alumina and chromia promoted by a minor amount of an oxide of manganese.

2. A process for dehydrogenating normally gaseous aliphatic hydrocarbons which comprises contacting said hydrocarbons at a temperature within the range of approximately 450–700° C. and a pressure not in excess of approximately 50–100 pounds per square inch with a catalytic agent consisting of alumina and chromia promoted by a minor amount of an oxide of manganese.

3. A process for dehydrogenating normally gaseous aliphatic hydrocarbons which comprises contacting said hydrocarbons under dehydrogenating conditions of temperature and pressure with a catalytic agent comprising a major portion of alumina supporting an oxide of chromium in the proportions of approximately 4–30% by weight of said alumina and an oxide of manganese.

4. A process for the dehydrogenation of normally gaseous paraffinic hydrocarbons to produce mono-olefins which comprises contacting said hydrocarbon under dehydrogenating conditions of temperature and pressure with a catalyst comprising activated alumina and chromia promoted by an oxide of manganese.

5. A process for the dehydrogenation of normally gaseous mono-olefinic hydrocarbons to produce diolefins which comprises contacting said hydrocarbons under dehydrogenating conditions of temperature and subatmospheric pressure with a catalyst comprising activated alumina and chromia having deposited thereon an oxide of manganese.

6. A process for dehydrogenating hydrocarbons which comprises contacting the hydrocarbons under dehydrogenating conditions with a catalyst comprising a major proportion of alumina and minor proportions of chromia and a manganese compound.

7. A process for dehydrogenating hydrocarbons which comprises contacting the hydrocarbons under dehydrogenating conditions with a catalyst comprising a major proportion of alumina and minor proportions of chromia and a manganese oxide.

8. A process for dehydrogenating hydrocarbons which comprises contacting the hydrocarbons under dehydrogenating conditions with a catalyst comprising alumina, chromia and an oxide of manganese.

9. A process for dehydrogenating normally gaseous hydrocarbons which comprises contacting the hydrocarbons under dehydrogenating conditions with a catalyst comprising alumina, chromia and an oxide of manganese.

10. The method of dehydrogenating normally gaseous hydrocarbons which comprises contacting said hydrocarbons under dehydrogenating conditions with a catalyst comprising an intimate mixture of chromium oxide and manganese oxide.

CHARLES L. THOMAS.